(12) United States Patent
Price et al.

(10) Patent No.: US 11,983,883 B2
(45) Date of Patent: May 14, 2024

(54) INTENSITY-BASED IMAGE MODIFICATION FOR COMPUTER VISION

(71) Applicant: The Boeing Company, Chicago, IL (US)

(72) Inventors: Caleb G. Price, Hazelwood, MO (US); Jeffrey H. Hunt, El Segundo, CA (US)

(73) Assignee: The Boeing Company, Arlington, VA (US)

( * ) Notice: Subject to any disclaimer, the term of this patent is extended or adjusted under 35 U.S.C. 154(b) by 294 days.

(21) Appl. No.: 17/448,858

(22) Filed: Sep. 24, 2021

(65) Prior Publication Data

US 2022/0189034 A1 Jun. 16, 2022

Related U.S. Application Data

(60) Provisional application No. 63/125,540, filed on Dec. 15, 2020.

(51) Int. Cl.
*G06T 7/13* (2017.01)
*B64D 47/08* (2006.01)

(52) U.S. Cl.
CPC .......... *G06T 7/13* (2017.01); *B64D 47/08* (2013.01); *G06T 2207/10016* (2013.01); *G06T 2207/10048* (2013.01); *G06T 2207/30261* (2013.01)

(58) Field of Classification Search
None
See application file for complete search history.

(56) References Cited

U.S. PATENT DOCUMENTS

| | | | |
|---|---|---|---|
| 5,323,987 A | 6/1994 | Pinson |
| 7,999,849 B2 | 8/2011 | Neff et al. |
| 8,294,712 B2 | 10/2012 | Nelson |
| 8,509,555 B2 | 8/2013 | Meany |
| 8,615,105 B1 | 12/2013 | Cheng et al. |
| 8,811,670 B2 | 8/2014 | Mundhenk et al. |
| 9,036,910 B1 | 5/2015 | Mundhenk et al. |
| 9,086,484 B2 | 7/2015 | Medasani et al. |
| 9,129,185 B1 | 9/2015 | Murata |
| 9,292,747 B2 | 3/2016 | Baker |
| 9,501,839 B1 | 11/2016 | Korchev et al. |
| 9,508,134 B2 | 11/2016 | Jiang et al. |
| 9,715,639 B2 | 7/2017 | Kwon et al. |
| 9,727,785 B2 | 8/2017 | Kwon et al. |
| 10,176,557 B2 | 1/2019 | Jiang et al. |
| 10,366,501 B2 | 7/2019 | Ray et al. |

(Continued)

*Primary Examiner* — Delomia L Gilliard

(74) *Attorney, Agent, or Firm* — Alleman Hall & Tuttle LLP

(57) ABSTRACT

A computer vision method and computer vision system can be used to process a time-based series of images. For a subject image of the time-based series, a light intensity value is identified for each pixel of a set of pixels of the subject image. A light intensity threshold is defined for the subject image based on a size of a bounding region for an object detected within a previous image of the time-based series captured before the subject image. A modified image is generated for the subject image by one or both of: reducing the light intensity value of each pixel of a lower intensity subset of pixels of the subject image that is less than the light intensity threshold, and increasing the light intensity value of each pixel of a higher intensity subset of pixels of the subject image that is greater than the light intensity threshold.

20 Claims, 9 Drawing Sheets

(56) References Cited

U.S. PATENT DOCUMENTS

| | | |
|---|---|---|
| 10,732,277 B2 | 8/2020 | Korchev et al. |
| 11,748,903 B2 * | 9/2023 | Cairl ...................... G06N 3/048 382/103 |
| 2007/0093945 A1 * | 4/2007 | Grzywna ............. G01C 21/005 701/23 |
| 2015/0063632 A1 * | 3/2015 | Deng ........................ G06T 7/70 382/103 |
| 2020/0104719 A1 | 4/2020 | Wiltshire |
| 2021/0287590 A1 * | 9/2021 | Park ...................... H04N 13/122 |
| 2022/0094896 A1 * | 3/2022 | Paul ....................... H04N 9/646 |
| 2023/0098223 A1 * | 3/2023 | Alghanem ............ G01S 17/931 701/26 |

* cited by examiner

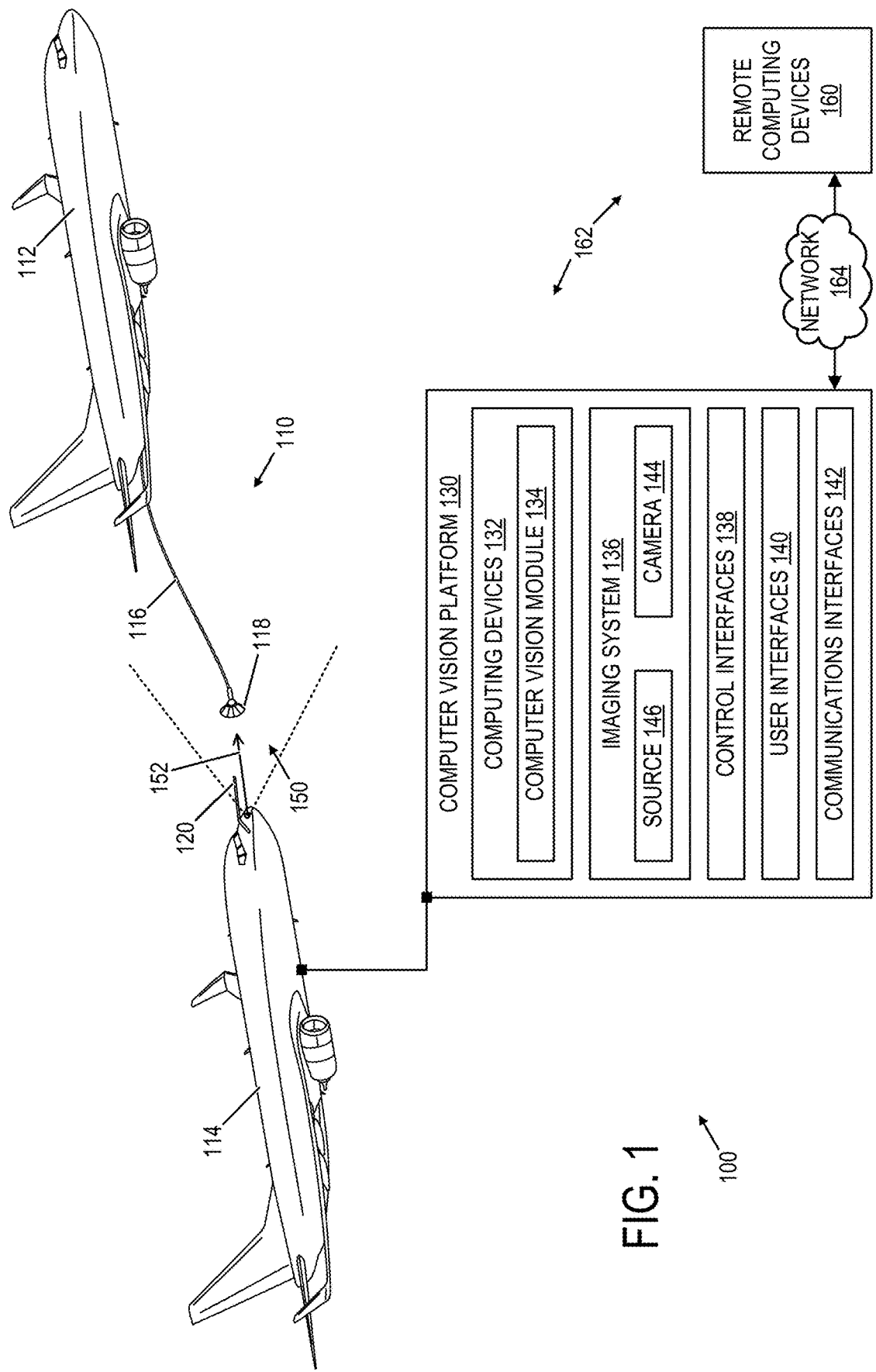

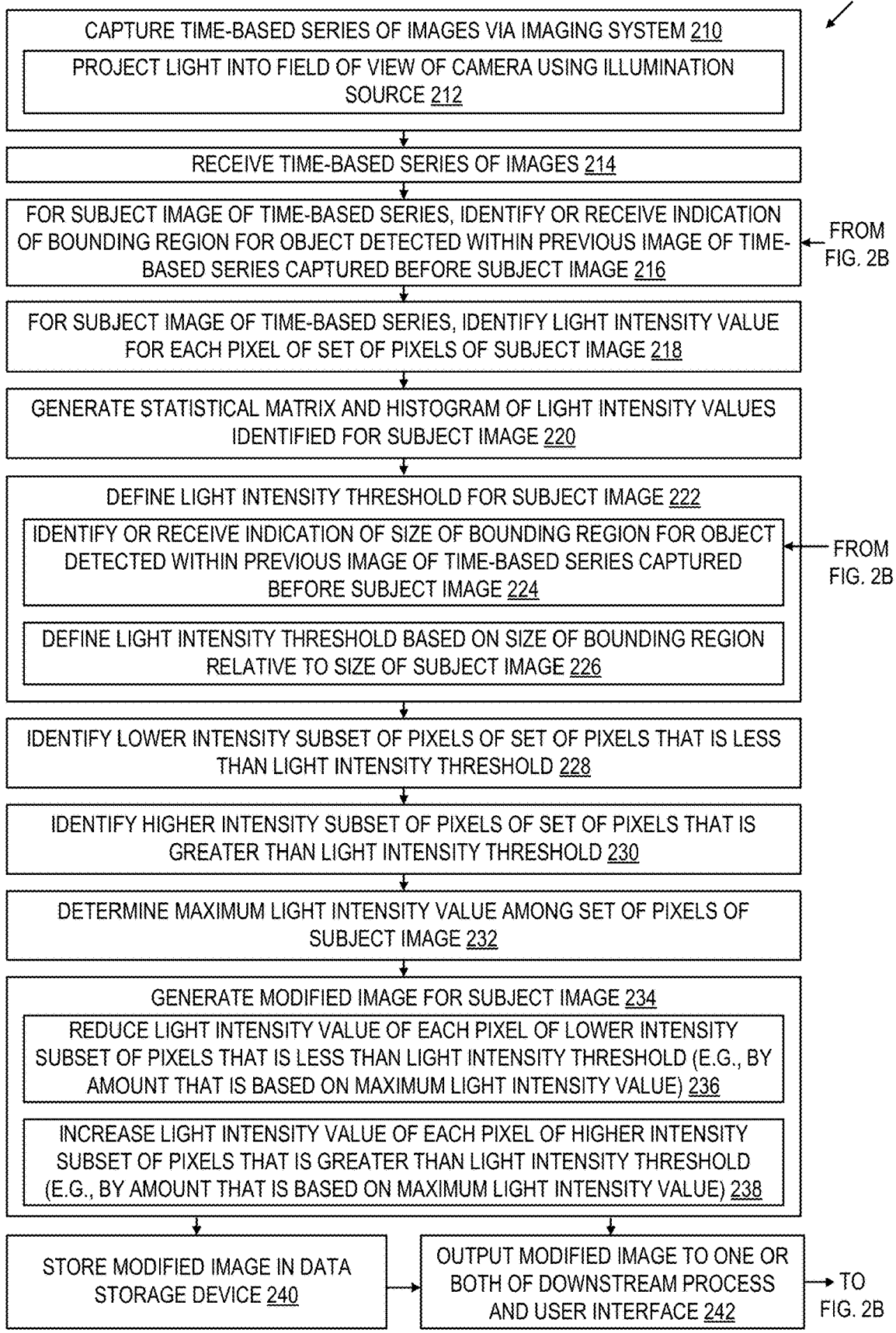

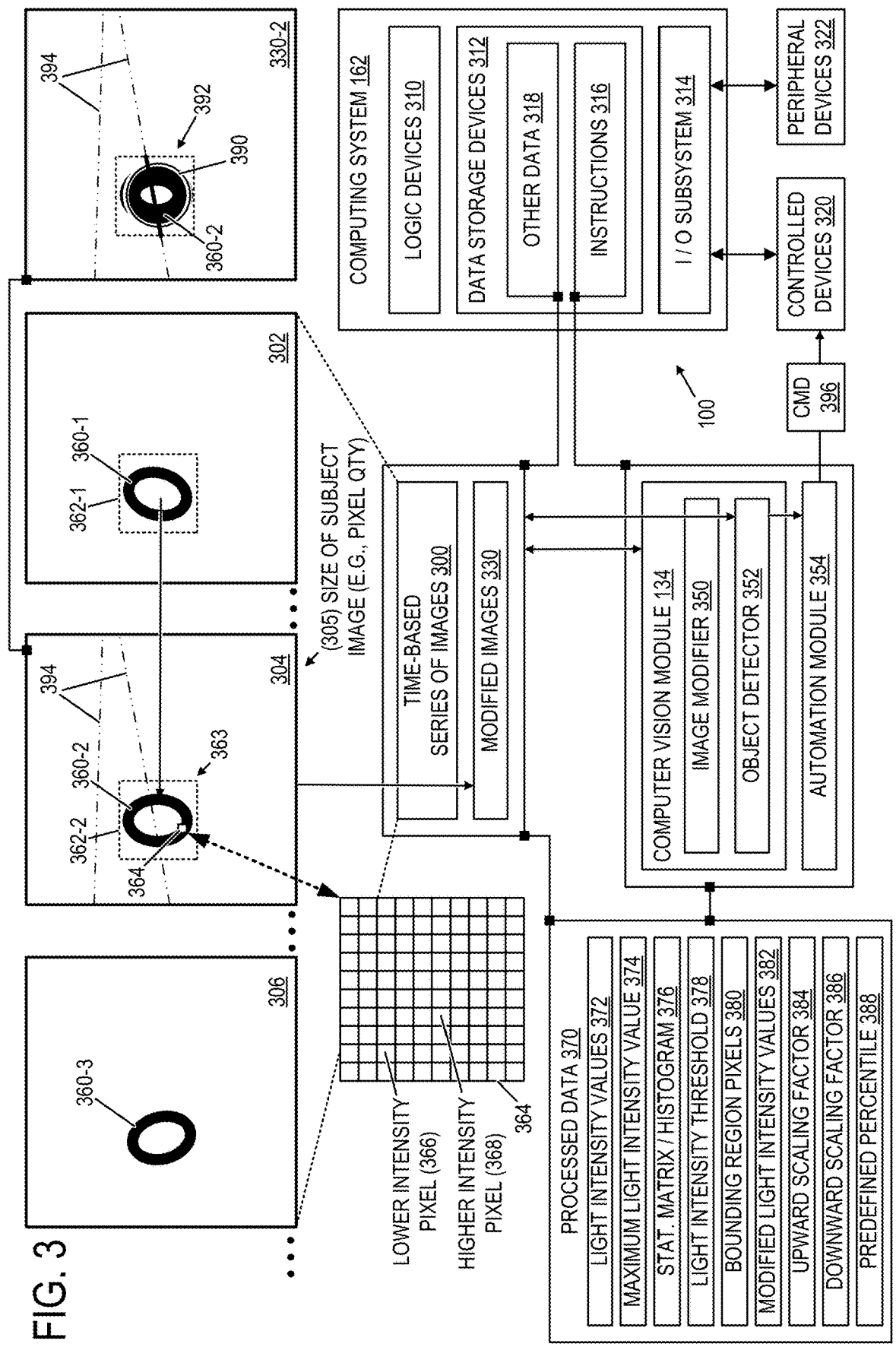

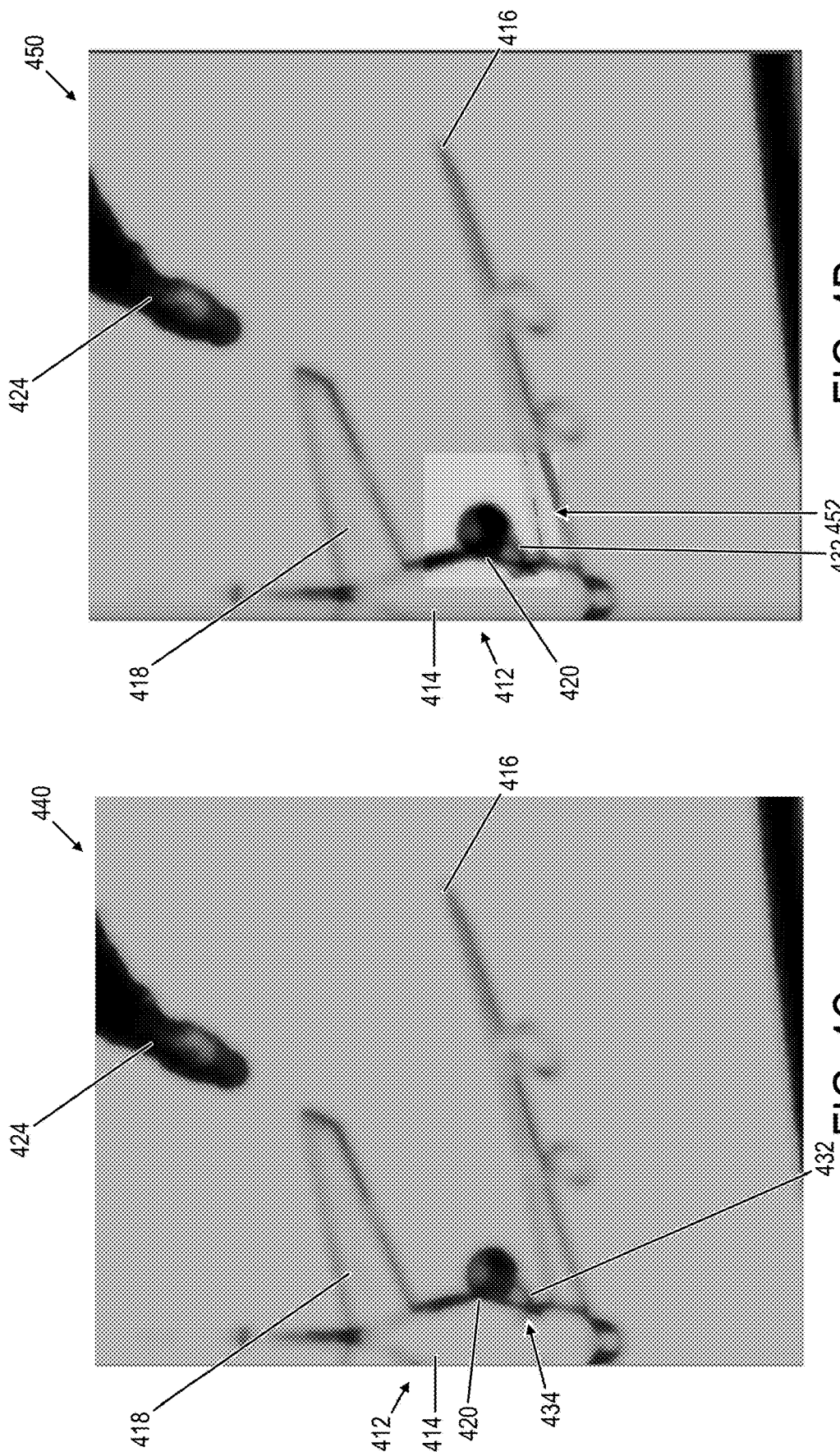

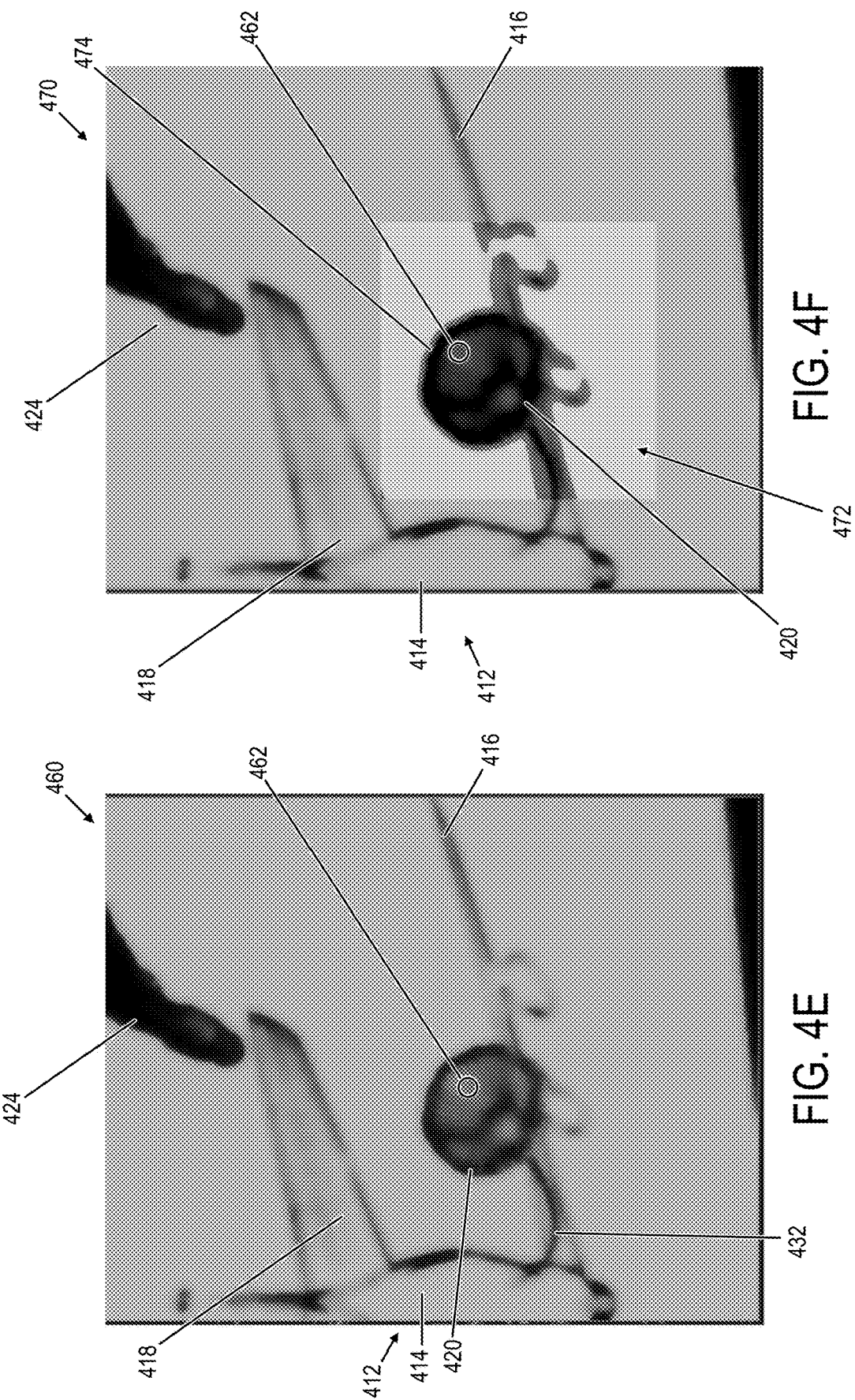

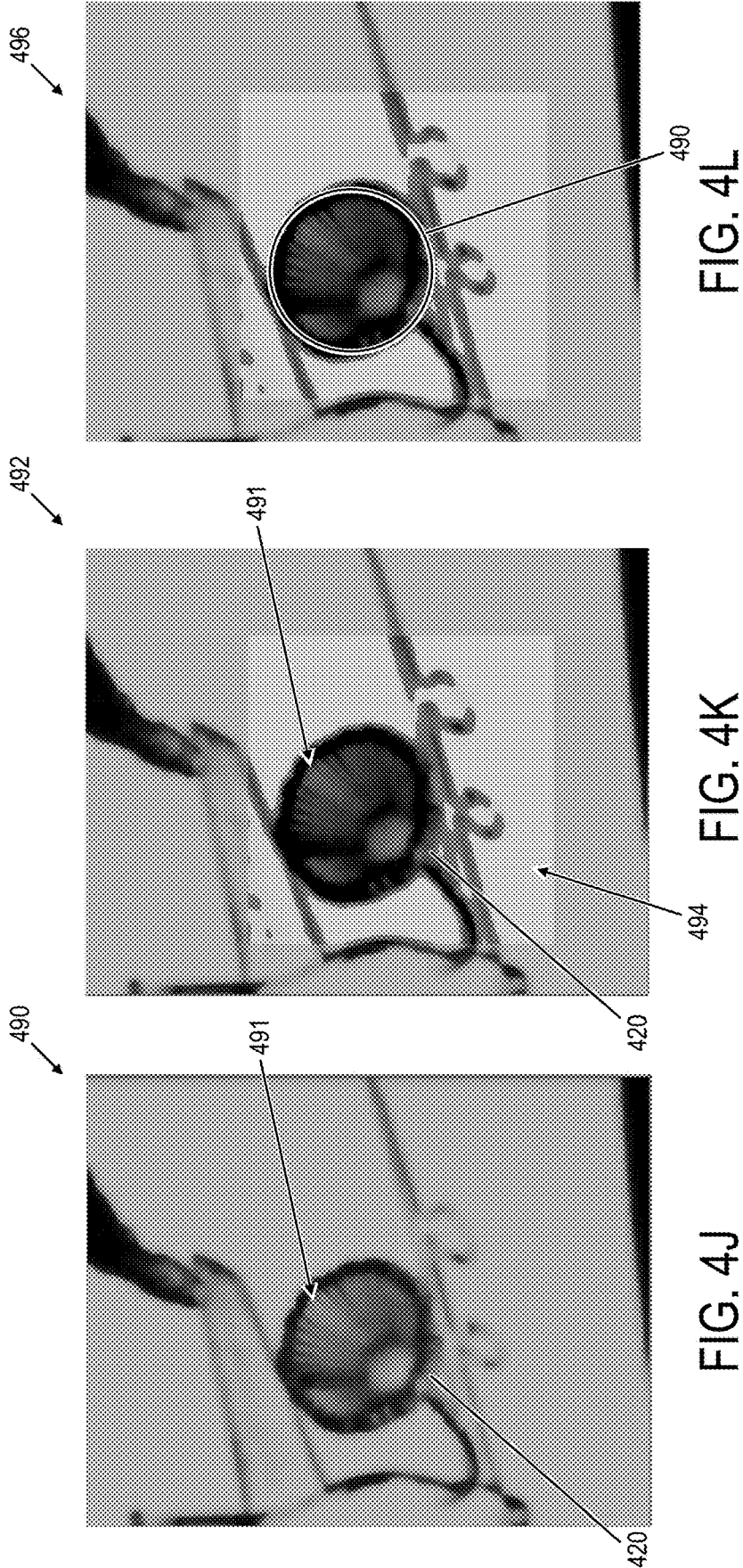

INTENSITY-BASED IMAGE MODIFICATION FOR COMPUTER VISION

CROSS REFERENCE TO RELATED APPLICATIONS

This application claims priority to U.S. Provisional Patent Application Ser. No. 63/125,540, filed Dec. 15, 2020, the entirety of which is hereby incorporated herein by reference for all purposes.

FIELD

An invention of the present disclosure relates generally to computer vision, and more particularly to processing images used for object detection and tracking.

BACKGROUND

Computer vision is used in a variety of fields to partially or fully automate tasks such as visually inspecting operating environments, receiving user input as part of a human-machine interface, and controlling other machines. One aspect of computer vision includes object detection and tracking in which images are programmatically analyzed for the presence of a predefined object or object class. Such images can include individual, standalone images or a time-based series of images that form a video.

SUMMARY

According to an aspect of the present disclosure, a computer vision method and computer vision system can be used to process a time-based series of images. For a subject image of the time-based series, a light intensity value is identified for each pixel of a set of pixels of the subject image. A light intensity threshold is defined for the subject image based on a size of a bounding region for an object detected within a previous image of the time-based series captured before the subject image. A modified image is generated for the subject image by one or both of: reducing the light intensity value of each pixel of a lower intensity subset of pixels of the subject image that is less than the light intensity threshold, and increasing the light intensity value of each pixel of a higher intensity subset of pixels of the subject image that is greater than the light intensity threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 is a schematic diagram depicting aspects of an example computer vision system within an operating environment.

FIGS. 2A and 2B are flow diagrams depicting aspects of an example computer vision method.

FIG. 3 is a schematic diagram depicting additional aspects of the computer vision system of FIG. 1 processing an example time-based series of images.

FIGS. 4A-4L show example images that can be captured and processed by the computer vision system of FIG. 1 performing aspects of the method of FIGS. 2A and 2B.

DETAILED DESCRIPTION

Figure 2B:
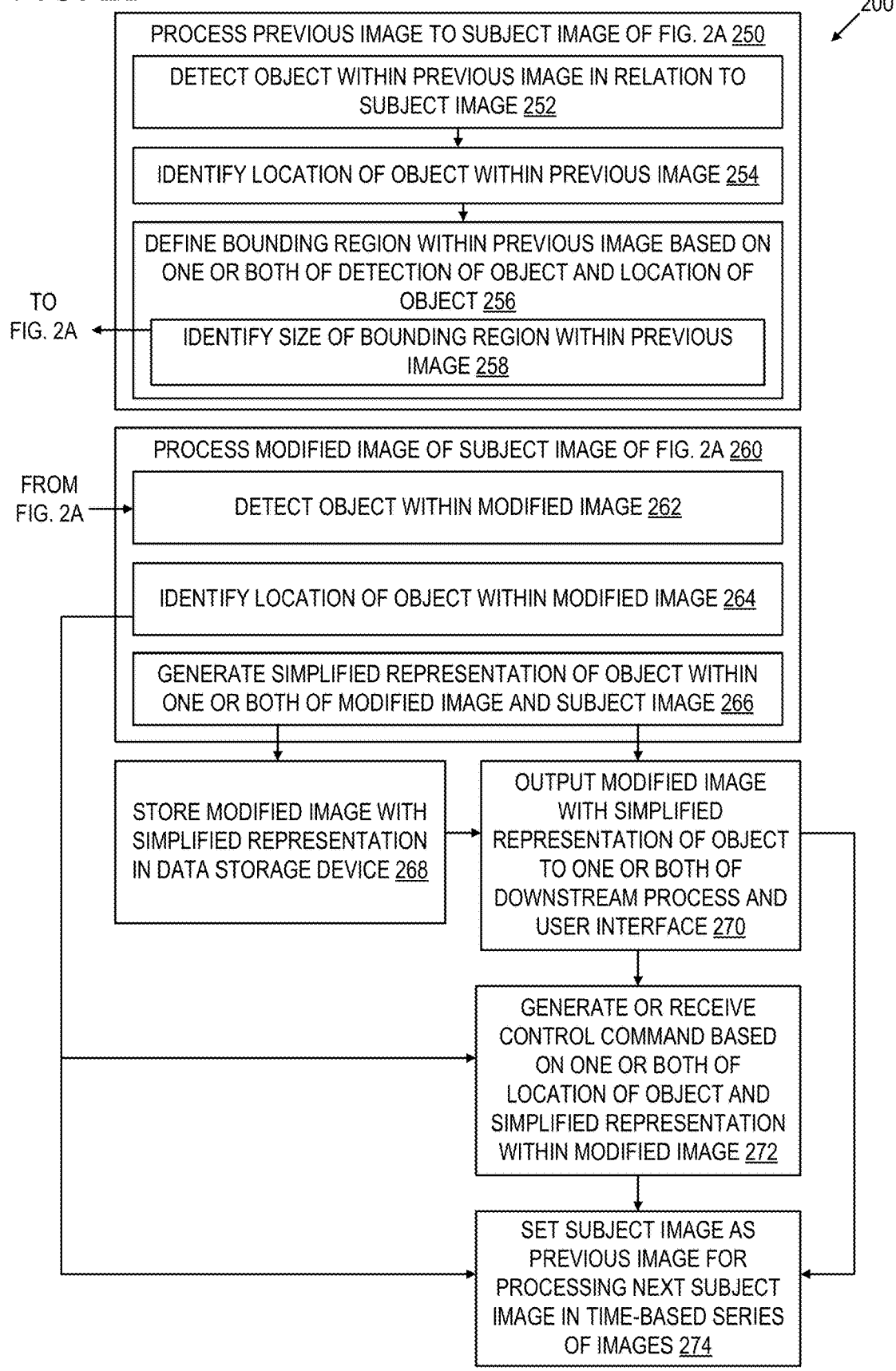

Computer vision technologies encounter a variety of challenges, depending on the operating environment, that can result in reduced performance, such as reduced accuracy or precision, increased consumption of processing resources, increased processing time, and increased energy consumption. As an example, objects can partially occlude each other, have complex structures, or have similar visual characteristics within sampled images that make it challenging for computer vision technologies to distinguish the objects from each other. The disclosed techniques have the potential to improve the performance of computer vision technologies such as object detection, object tracking, object segmentation, and edge detection by pre-processing images to selectively increase contrast between lower light intensity pixels and higher light intensity pixels within a region of interest of the images.

According to an example, higher intensity pixels that have a light intensity value above a threshold can be modified to increase the light intensity of those higher intensity pixels. Additionally or alternatively, lower intensity pixels that have a light intensity value below the threshold can be modified to reduce the light intensity of those lower intensity pixels. Selection of the light intensity threshold that separates the lower intensity pixels from the higher intensity pixels can be based, at least in part, on a relative size of a region of interest within the image.

By modifying images to increase light intensity for pixels at the top end of the intensity spectrum and to reduce light intensity for pixels within the remaining lower end of the intensity spectrum, object features located within the modified images can be accentuated while other features can be diminished. Such modification can further provide the appearance of object features being eroded, blurred, or smoothed within the modified images. The modified images can be provided to downstream computer vision processes that are configured to identify features that correspond to the features accentuated by modification of the image through selective adjustment of pixel light intensity. This pre-processing approach of images has the potential to achieve increased performance of computer vision technologies as compared to the use of the images without such pre-processing.

FIG. 1 shows a schematic diagram depicting aspects of an example computer vision system 100 within an operating environment. In this example, computer vision system 100 is used within the context of an aerial refueling operation 110 in which a first aeronautical vehicle 112 supplies fuel to a second aeronautical vehicle 114 via a flexible hose 116. Within the example of FIG. 1, a probe and drogue configuration is depicted, in which a drogue 118 (e.g., a basket) mounted to hose 116 trailing first aeronautical vehicle 112 is used to capture and guide a probe 120 of second aeronautical vehicle 114 to establish a connection between the probe and a terminal end of the hose. Computer vision system 100 can be used, for example, to partially or fully automate, or otherwise assist human operators with alignment of probe 120 and drogue 118 as part of aerial refueling operation 110.

Second aeronautical vehicle 114 in this example includes a computer vision platform 130, components of which are shown schematically in further detail in FIG. 1. Components of computer vision platform 130 are located on-board second aeronautical vehicle 114 in this example. However, in other examples, some components of computer vision platform 130 can be located on-board other types of mobile platforms or can be integrated with stationary platforms.

Computer vision platform 130 can include one or more computing devices 132 that implements a computer vision module 134, an imaging system 136, one or more control interfaces 138 for controlling second aeronautical vehicle 114, one or more user interfaces 140 for interacting with human operators, and one or more communications interfaces 142 for communicating with other devices, among other suitable components.

Imaging system 136 can include one or more cameras of which camera 144 is an example. Camera 144 can be used to capture images of a scene within a field of view 150 of the camera that can be processed by computer vision system 100. Within the context of the refueling operation of FIG. 1, for example, camera 144 can be mounted to second aeronautical vehicle 114 at an orientation that is suitable for capturing images of field of view 150 that corresponds to a forward travel direction of the second aeronautical vehicle. As an example, camera 150 can be configured to capture images of drogue 118, probe 120, hose 116, and first aeronautical vehicle 112 within field of view 150.

In at least some examples, camera 144 can be paired with an illumination source 146 that is configured to project light 152 into field of view 150 that can be reflected by objects located within the field of view. As an example, camera 144 can take the form of an infrared camera that is configured to capture images within at least a portion of an infrared range of electromagnetic spectrum, and illumination source 146 can take the form of an infrared illumination source that projects light within the portion of the infrared range of electromagnetic spectrum captured by the camera.

While infrared is described as an example range of electromagnetic spectrum, camera 144 or other cameras of imaging system 136 can be configured to capture images in different ranges of electromagnetic spectrum, including visible light ranges, as an example. Illumination source 146 or other illumination sources of imaging system 136 can be similarly configured to project light of any suitable range of electromagnetic spectrum that can be captured by the cameras of the imaging system, including visible light ranges of electromagnetic spectrum. Light 152 projected by illumination source 146 can be diffuse, unstructured light, in at least some examples. However, other suitable illumination techniques can be used, including structured light, time-varying light, or a combination thereof.

Images captured by camera 144 can be processed locally at computer vision platform 130 by the one or more computing devices 132 implementing computer vision module 134. Additionally or alternatively, images captured by camera 144 can be processed remotely from computer vision platform 130, such as by one or more remote computing devices 160. As examples, remote computing devices 160 can implement an instance or component of computer vision module 134, or such processing can be performed in a distributed manner between or among computing devices 132 and remote computing devices 160 collectively implementing computer vision module 134. In the example of FIG. 1, remote computing devices 160 are located off-board second aeronautical vehicle 114. Remote computing devices 114 can be located at a stationary, terrestrial, ground-based facility or on-board a mobile platform, such as another aeronautical vehicle (e.g., first aeronautical vehicle 112), a terrestrial, ground-based vehicle or water-based vehicle, orbiting satellite, etc., as examples. Computing devices 132 and remote computing devices 160 can form a computing system 162 that is distributed and configured for coordinated processing.

Communications interfaces 142 can be configured to facilitate communications between computer vision platform 130 and remote devices, including remote computing devices 160. For example, communications between computer vision platform 130 and remote computing devices 160 can traverse one or more communication networks 164. Networks 164 can include wireless networks and wired networks, and communications over such networks can utilize any suitable communications technology and protocol.

Control interfaces 138 can include any suitable interface that can be used to provide a control input to one or more controlled devices, such as controlled devices of second aeronautical vehicle 114. For example, control interfaces 138 can be used to provide control inputs for operating second aeronautical vehicle 114. Control interfaces 138 can be operable by human operators or a machine (e.g., an auto-pilot module implemented by computing devices 132). User interfaces 140 can include input devices and output devices by which human operators can interact with computer vision platform 130, including with computing devices 132 and control interfaces 138.

FIGS. 2A and 2B show flow diagrams depicting aspects of an example computer vision method 200. As an example, method 200 can be performed to pre-process images before application of downstream computer vision techniques, including objection detection, object tracking, object segmentation, edge detection, etc. For example, an object to be detected and tracked within the pre-processed images can include a feature (e.g., a circular rim) of drogue 118 of FIG. 1.

According to method 200, a subject image within a time-based series of images (e.g., of a video) is processed to generate a modified image that can be provided to downstream processes and user interfaces, for example, to assist in performing a task based on the modified image. Aspects of method 200 described with reference to this subject image can be performed for each image or a subset of the time-based series of images by repeating some or all of the operations of method 200 to obtain a time-based series of modified images (e.g., a modified video).

Method 200 can be performed, at least in part, by a computing system, such as example computing system 162 of FIG. 1, which can include one or more computing devices 132 of computer vision platform 130. Additionally or alternatively, the computing system performing method 200 can include one or more remote computing devices 160. For example, the computing system can execute instructions (e.g., of computer vision module 134 of FIG. 1) at one or more logic devices (e.g., processors) to perform aspects of method 200.

At 210, the method can include capturing a time-based series of images via an imaging system. As an example, the time-based series of images can form a video having a frame rate in which each frame corresponds to a respective image of the time-based series. The imaging system can refer to example imaging system 136 of FIG. 1, for example. Accordingly, the imaging system can include a camera (e.g., 144 of FIG. 1) that captures the images at 210.

In examples where the imaging system includes an illumination source (e.g., 146 of FIG. 1), the method at 212 can further include projecting light into a field of view of the camera using the illumination source. The time-based series of images captured at 210 can include infrared images in the case of the camera being configured to capture light within the infrared range of electromagnetic spectrum, including infrared light projected by the illumination source at 212 that is reflected from objects present within the field of view of the camera. An example of an infrared range of electromagnetic spectrum that can be used with method 200 includes Long Wavelength InfraRed (LWIR), which includes wavelengths of 8 μm to 14 μm. However, the images captured at 210 can additionally or alternatively include other ranges of electromagnetic spectrum, including other forms of infrared or visible light, as examples.

At 214, the method can include receiving the time-based series of images captured at 210. As an example, the computing system can receive the time-based series of images from the camera as a video or image stream. As described in further detail with reference to FIG. 3, each of the images received at 214 can include an array of pixels in which each pixel has a respective pixel identifier and an associated light intensity value measured by the camera for that pixel. Within the context of an infrared image, for example, the light intensity value for each pixel represents the infrared light intensity as measured by the camera for that pixel. In at least some examples, the computing system can buffer or otherwise store the raw images captured at 210 for processing, including for real-time, near-real-time (e.g., best effort), or offline processing.

At 216, the method can include, for a subject image of the time-based series of images, receiving an indication of a bounding region representing a region of interest within the subject image. As an example, the bounding region can be defined as including a specific subset of pixels of the image frame. In at least some examples, the pixels of the bounding region can be identified by respective pixel identifiers, enabling the computing system to determine for each pixel of the subject image, whether that pixel is located within the bounding region or not located within the bounding region.

In at least some examples, the bounding region can be provided for an object or a feature of an object detected within a previous image of the time-based series of images captured before the subject image. For example, the previous image can refer to the immediately preceding image within the time-based series. Aspects of method 200 described with reference to FIG. 2B provide one example of how a bounding region can be defined or otherwise identified. However, in other examples, the use of a bounding region can be omitted, and the techniques describe herein can be applied to the entire subject image or to a predefined region of the subject image.

At 218, the method can include, for the subject image of the time-based series of images, identifying a light intensity value for each pixel of a set of pixels of the subject image. The set of pixels can include some or all of the pixels of the subject image. For example, the set of pixels can include a subset of pixels of the subject image that correspond to the bounding region of operation 216. The computing system can buffer or otherwise store the light intensity values identified for each pixel as part of operation 218 for subsequent processing, including for real-time, near-real-time (e.g., best effort), or offline processing.

At 220, the method can include generating a statistical matrix and a histogram of the light intensity values identified for the subject image at operation 218. As an example, a histogram of light intensity values can include a plurality of light intensity bins for which each pixel of the set of pixels is assigned based on the light intensity value identified at 218 for that pixel.

At 222, the method can include defining a light intensity threshold for the subject image. In at least some examples, the light intensity threshold can be defined based, at least in part, on a size of the bounding region identified or indicated at 216. For example, as part of operation 222, the method at 224 can include identifying or receiving an indication of the size of the bounding region for the object detected within the previous image of the time-based series captured before the subject image (e.g., as previously described with reference to operation 216). The size of the bounding region can be identified, for example, using aspects of method 200 of FIG. 2B, as described in further detail herein. As an example, the size of the bounding region can be defined by one or more values representing a quantity of pixels (e.g., 1000 pixels) contained within the bounding region, one or more spatial dimensions of the bounding region (e.g., a radius of 50 pixels of a circular bounding region, length and width pixel quantities for a rectangular bounding region, etc.), or a relative size of the bounding region as compared to the subject image (e.g., 10%).

At 226, the method can include defining the light intensity threshold based on the size of the bounding region relative to the size of the subject image. In at least some examples, the light intensity threshold may be defined using a predefined relationship (e.g., a look-up table, map, or function) stored in a data storage device that is accessible to the computing system. This predefined relationship can be used by the computing system to determine a light intensity threshold based on one or more input values representing the size of the bounding region relative to the size of the subject image. As an example, for a smaller bounding region relative to the size of the subject image, the light intensity threshold can be set to a lower value within a range of values, while for a relatively larger bounding region relative to the size of the subject image, the light intensity threshold can be set to a higher value within the range of values. This approach accounts for the relationship between light intensity and proximity of objects to the camera. For example, light intensity values can increase for a given illumination condition as objects within the field of view of the camera move closer to the camera or closer to the illumination source due to reduced diffusion of reflected light.

In at least some examples, the light intensity threshold can be defined as a light intensity value identified at operation 218 for a pixel of the set of pixels (e.g., the bounding region) that represents a predefined percentile or ranking of light intensity values identified among the set of pixels. As an example, the predefined percentile can be within a value within the range of 63%-67% in which pixels under the predefined percentile have a lower light intensity value than pixels over the predefined percentile. However, other suitable light intensity thresholds or techniques for defining such thresholds may be used. In at least some examples, the predefined light intensity threshold can be based on results of testing of the computer vision platform within a particular class of use environments (e.g., aerial refueling operation 110 of FIG. 1). Defining the light intensity threshold at 222 can use the statistical matrix and histogram generated at 220 as input.

At 228, the method can include identifying a lower intensity subset of pixels of the set of pixels that have light intensity values that are less than the value of the light intensity threshold identified at 222. As an example, the computing system can associate pixel identifiers of the set of pixels with a lower intensity identifier for pixels that exhibit a light intensity value that is less than the value of the light intensity threshold.

At 230, the method can include identifying a higher intensity subset of pixels of the set of pixels that have light intensity values that are greater than the value of the light intensity threshold identified at 222. As an example, the computing system can associate pixel identifiers of the set of pixels with a higher intensity identifier for pixels that exhibit a light intensity value that is greater than the value of the light intensity threshold.

Following operations 228 and 230, each pixel of the set of pixels (e.g., within the bounding region) can be identified as having a light intensity value that is either above or below the light intensity threshold. As an example, if the value of the light intensity threshold is set at 65% of the population of pixels based on light intensity, then 65% of the pixels of the set of pixels can be identified as being part of the lower intensity subset and 35% of the pixels of the set can be identified as being part of the higher intensity subset.

At 232, the method can include determining a maximum light intensity value among the set of pixels of the subject image. However, in other examples, the maximum intensity value may refer to an average or other suitable statistical combination of a predefined top percentile (e.g., 1%) of the intensity values among the set of pixels. In still further examples, the maximum light intensity value determined at 232 can instead be defined by a predefined light intensity value. This predefined light intensity value can be based on results of testing of the computer vision platform within a particular class of use environments.

At 234, the method can include generating a modified image for the subject image. As an example, generating the modified image at 234 can be performed by, at 236, reducing the light intensity value of each pixel of the lower intensity subset of pixels of the subject image that is less than the light intensity threshold. Additionally or alternatively, generating the modified image at 234 can be performed by, at 238, increasing the light intensity value of each pixel of the higher intensity subset of pixels of the subject image that is greater than the light intensity threshold. Accordingly, the modified image can be generated at 234 by performing one or both of operations 236 and 238. Following operation 234, the modified image has greater contrast between the lower intensity subset of pixels and the higher intensity subset of pixels.

In at least some examples, modification of the light intensity value of each pixel of the set of pixels at operation 234 can be defined as a function of the light intensity value identified for that pixel at operation 218. For example, a measured light intensity of a "hot" pixel identified as a higher intensity pixel can be increased by an upward scaling factor (e.g., 10%) of the measured light intensity of the hot pixel, while a measured light intensity of a "cool" pixel identified as being a lower intensity pixel can be reduced by a downward scaling factor (e.g., 15%) of the measured light intensity of the cool pixel.

In examples where the magnitude of the decrease in light intensity value of each lower intensity pixel is based, at least in part, on the measured light intensity of that pixel, the lower intensity pixels converge toward a more similar light intensity value (i.e., deviate less from an average light intensity of the lower intensity pixels). Similarly, in examples where the magnitude of the increase in light intensity value of each higher intensity pixel is based, at least in part, on the measured light intensity of that pixel, the higher intensity pixels converge toward a more similar light intensity value (i.e., deviate less from an average light intensity of the higher intensity pixels). This convergence of light intensity among lower intensity pixels and separately among higher intensity pixels can create the appearance of object features being eroded, blurred, or smoothed within the modified image. These effects can be achieved in addition to the increased contrast that is provided between the higher intensity pixels and the lower intensity pixels within the modified image as compared to the pre-processed image.

Furthermore, in at least some examples, a magnitude of the increase or reduction in light intensity values can be based on the maximum light intensity value determined at 232. As an example, a magnitude of the increase in light intensity values for the higher intensity pixels can be increased as the maximum light intensity value increases. Conversely, a magnitude of the increase in light intensity values for the higher intensity pixels can be decreased as the maximum light intensity value decreases. As an example, a magnitude of the reduction in light intensity values for the lower intensity pixels can be increased as the maximum light intensity value increases. Conversely, a magnitude of the reduction in light intensity values for the lower intensity pixels can be decreased as the maximum light intensity value decreases. Accordingly, a magnitude of an upward light intensity scaling of higher intensity pixels and a magnitude of a downward light intensity scaling of lower intensity pixels can be based on the maximum light intensity value.

Reduction of the light intensity value of the lower intensity subset of pixels can be the same or a different relative magnitude (e.g., percentage of the original value) as the increase of the light intensity value of the higher intensity subset of pixels. As an example, each pixel of the lower intensity subset of pixels can be reduced by a downward scaling factor within a range of 12-18% (e.g., 15%) of the pixel's light intensity value identified at 218, while each pixel of the higher intensity subset of pixels can be increased by an upward scaling factor within a range of 8%-12% (e.g., 10%) of the pixel's light intensity value identified at 218. Thus, in this particular example, the higher intensity subset of pixels are increased by a lesser amount as compared to their original light intensity value as compared to the lower intensity subset of pixels. However, in other examples, the magnitude of increase or decrease of the light intensity values of pixels (e.g., scaling factor) can have other suitable values. In still further examples, the magnitude of increase or decrease of the light intensity value can be a predefined value. This predefined value can be based on results of testing of the computer vision platform within a particular class of use environments.

At 240, the method can include storing the modified image in a data storage device. As an example, the modified image can be stored in a buffer or other suitable storage configuration as a time-based series of modified images for the time-based series captured by the imaging system at 210.

At 242, the method can include outputting the modified image to one or more of a downstream process and a user interface. As an example, the downstream process can include an object detector component of computer vision module 134 of FIG. 1, described in further detail with reference to FIG. 3. As another example, the user interface can include a graphical user interface (GUI) presented via a display device, enabling a human operator to reference the modified image as part of performing a task. Outputting the modified image at 242 can include outputting the modified image within a time-based series of modified images respectively generated from the time-based series of images received at 214 (e.g., as a modified video). In at least some examples, the modified image output at 242 can be retrieved from a data storage device, such as from the location where the modified image was previously stored at 240. From operation 242, the method can proceed to FIG. 2B.

Referring also to FIG. 2B, prior to generating the modified image at operation 234, the method at 250 can include processing the previous image (e.g., an immediately preceding image within the time-based series) in relation to the subject image of FIG. 2A. As part of processing performed at 250, the method can include detecting the object within the previous image in relation to the subject image of FIG. 2A. The previous image in this example is one of the time-based series of images captured at 210 and received at 214 of FIG. 2A. For this previous image, the object detected at 252 can be detected using a modified version of the previous image that was obtained by performing operations 210-242 of FIG. 2A with respect to the previous image. However, under some conditions, a bounding region for the previous image may not be available with respect to the subject image, such as where the subject image is the first image of the time-based series of images captured at operation 210 of FIG. 2A. In this case, the image captured by the camera without modification described at operation 234 can be used as the previous image.

At 254, as part of the processing performed at 250, the method can include identifying a location of the object detected within the previous image at operation 252. The location can be identified by a collection of pixel identifiers, as an example. In at least some examples, operations 252 and 254 can be performed by an object detector component of computer vision module 134 of FIG. 1. An example object detector is described in further detail with reference to FIG. 3.

At 256, the method can include defining a bounding region within the previous image based on one or both of detection of the object at 252 and the location of the object identified at 254. As an example, the bounding region can surround or otherwise include the entire object or a portion of the object containing a predefined feature (e.g., a circular rim of drogue 118 of FIG. 1 that receives probe 120). In at least some examples, the bounding region can be defined to have a predefined geometric shape, such as a circle, ellipse, rectangle, square, etc. In other examples, the bounding region can be an irregular shape that is defined to generally follow a profile of the object or the predefined feature of the object as orientated within the image.

As part of operation 256, the method at 258 can include identifying the size of the bounding region within the previous image. As an example, the size of bounding region can be identified as a value representing a quantity of pixels of the bounding region (e.g., 10,000 pixels) or by one or more values representing size dimensions of the bounding region (e.g., 100 pixels by 100 pixels in the case of a rectangular bounding region, or a diameter of 50 pixels in the case of a circular bounding region). An indication of the size of the bounding region identified at 258 can be output for use at operation 224 of FIG. 2A.

Additionally, within FIG. 2B, the modified image output at operation 242 for the subject image of FIG. 2A can be processed at 260. In at least some examples, operations 250, 252, 254, 256 and 258 previously described with respect to the previous image in relation to the subject image of FIG. 2A can be similarly performed with respect to the modified image for the subject image of FIG. 2A output at operation 242. For example, as part of operation 260, the object can be detected within the modified image at operation 262 and the location of the object can be identified within modified image at 264.

Additionally, as part of operation 260, a simplified representation of the object can be generated within one or both of the modified image and the subject image at 266. The simplified representation can take the form of a predefined geometric shape (e.g., circle, oval, square, etc.), as an example. In at least some examples, this simplified representation can generally correspond to a feature of the object detected within the subject image, such as a simplified representation that forms a circle overlaid upon a circular rim of refueling drogue present within the subject image.

At 268, the method can include storing one or both of the modified image containing the simplified representation and the subject image that was modified with the simplified representation (also a modified image) in a data storage device. Each modified image generated to include the simplified representation at 266 can be stored in a buffer or other suitable storage configuration as part of a time-based series of images.

At 270, the method can include outputting the modified image with the simplified representation to one or both of a downstream process and a user interface. As an example, the downstream process can include an automation module implemented by a computing system, described in further detail with reference to FIG. 3. As another example, the user interface can include a graphical user interface (GUI) presented via a display device, enabling a human operator to reference the modified image with the simplified representation as part of performing a task. Outputting the modified image at 270 can include outputting the modified image with the simplified representation within a time-based series of images respectively generated from the time-based series of images received at 214 (e.g., as a modified video). In at least some examples, the modified image output at 270 can be retrieved from a data storage device, such as from the location where the modified image was previously stored at 268.

From either of operations 264 or 270, a control command that is based on one or both of the modified image with the simplified representation and the location of the object identified within the modified image can be generated or received at 272 from another downstream process or user interface. As an example, an automation module executed by a computing system can receive one or both of the location of the object and the simplified representation of the object as input, and can generate a particular control command to a controlled device in response to the input. Within the context of aerial refueling operation 110 of FIG. 1, for example, the control command can be provided to one or more control interfaces 138 to control operation of second aeronautical vehicle 114, such as to direct probe 120 to within drogue 118. As another example, a human operator can provide a control command via user interfaces 140 responsive to presentation of the modified image with the simplified representation, such as to direct probe 120 to within drogue 118.

From either of operations 264, 270 or 272, the subject image can be set at 274 as the previous image for processing a next subject image in the time-based series of images. Aspects of method 200 can be repeated for each image of the time-based series of images.

FIG. 3 is a schematic diagram depicting additional aspects of computer vision system 100 of FIG. 1 processing an example time-based series of images 300. Within FIG. 3, images 300 include at least image 302, image 304, image 306, etc. In this example, image 302 was captured prior to image 304, and image 304 was captured prior to image 306 among images 300. An object 360-1 is present in image 302. Object 360-1 of image 302 is also present in image 304 as object 360-2 and in image 306 as object 360-3.

It will be understood that images 300 can include tens, hundreds, thousands, or more images, and such images can form a video in at least some examples. Image 304, as an example of a subject image processed by method 200 of FIGS. 2A and 2B, as a size 305 that can be represented by a quantity of pixels. Each image of the time-based series of images 300 can also have the same size as image 304, such as where each of the images were captured by the same camera.

Computing system 162 of FIG. 1 is depicted in further detail in FIG. 3 including one or more logic devices 310 (e.g., processor devices), one or more data storage devices 312 (e.g., memory devices), and an input/output subsystem 314. As previously described with reference to FIG. 1, computing system 162 can include one or more computing devices 132 that form part of computer vision platform 130. Additionally or alternatively, computing system 162 can include one or more remote computing devices 160.

Data storage devices 312 include instructions 316 (e.g., one or more programs or program components) stored thereon that are executable by logic devices 310 to perform method 200 of FIG. 2. Instructions 316 include computer vision module 134 of FIG. 1. Computer vision module 134 includes an image modifier component 350 that is executable to perform operations relating to pre-processing of images 300 to generate modified images 330, such as previously described with reference to operations 210-240 of FIG. 2A. Computer vision module 134 further includes object detector component 352 that is executable to perform operations relating to detecting objects within images 300 and within modified images 330, such as previously described with reference to operations 250 and 260 of FIG. 2B. Furthermore, in this example, instructions 316 include an automation module 354 that can partially or fully automate control operations or other tasks based on objects detected by object detector 352 of computer vision module 134, such as previously described with reference to operation 272 of FIG. 2B.

Data storage devices 312 further include other data 318 stored thereon, which can include data representing images 300, modified images 330, processed data 370 generated or otherwise obtained by one or both of computer vision module 134 and automation module 354 through performance of the methods and techniques disclosed herein, among other suitable forms of data.

Among images 300, image 302 is schematically depicted as including object 360-1 that has been detected by object detector 352, and a bounding region 362-1 that has been defined with respect to image 302. Furthermore, within FIG. 3, image 304 captured after image 302 is an example of the subject image of method 300 of FIG. 3, and image 302 is an example of the previous image in relation to the subject image within the time-based series of images. With respect to image 304, an instance of the bounding region 362-1 defined with respect to image 302 is schematically depicted with respect to image 304 as bounding region 362-2. This bounding region 362-2 includes the same pixel locations and pixel identifiers within image 304 as the pixel locations and pixel identifiers of bounding region 362-1 within image 302. However, pixel intensity values of each pixel can differ between images 302 and 304 for the same pixel location and pixel identifier. A size 363 of bounding region 362-2 can be represented by a quantity of pixels (e.g., the same quantity of pixels that forms bounding region 362-1. In this manner, region 362 may refer to either 362-1 or 362-2.

Bounding region 362-2 can refer to the set of pixels for which light intensity values can be identified at operation 218 of FIG. 2A. For example, within FIG. 3, light intensity values 372 for the set of pixels are depicted within processed data 370. Within FIG. 3, a detailed subregion 364 of image 304 is shown in further detail as including an array of pixels that includes lower intensity pixel 366 and higher intensity pixel 368. Pixel 366 is an example of a pixel of image 304 identified as a lower intensity subset of pixels at operation 228 of FIG. 2A. Pixel 368 is an example of a pixel of image 304 identified as a higher intensity subset of pixels at operation 230 of FIG. 2A.

Other examples of processed data 370 include a maximum light intensity value 374 among pixels within bounding region 362-2, which is an example of the maximum light intensity value identified at operation 232 of FIG. 2A; a statistical matrix and histogram 376 of light intensity values 374, which is an example of the statistical matrix and histogram generated at operation 220 of FIG. 2A; a light intensity threshold 378 for image 304, which is an example of the light intensity threshold defined at operation 222 of FIG. 2A; bounding region pixels 380 of bounding region 362-2, which is an example of the set of pixels processed by method 200 of FIG. 2A and provides an indication of the size of the bounding region that can be used to define the light intensity threshold; modified light intensity values 382 for image 304 that can be obtained by one or both of reducing the light intensity values at operation 236 and increasing the light intensity values at operation 238 of FIG. 2A for the modified image; an upward scaling factor 384 that can be applied to higher intensity pixels as part of operation 238 of FIG. 2A; a downward scaling factor 386 that can be applied to lower intensity pixels as part of operation 236 of FIG. 2A; and a predefined percentile 388 that can be used to define light intensity threshold 378 as part of operation 222 of FIG. 2A.

An example modified image 330-2 for image 304 is depicted schematically in FIG. 3. In this example, modified image 330-2 includes a simplified representation 390 of object 360-2 that has been generated within the modified image by computer vision module 134. For example, object 360-2 has been identified at a location 392 by object detector 352. In at least some examples, the simplified representation can take the form of a geometric shape that represents an ideal view (e.g., an orthogonal view) of a feature of the object. Within the context of the object being drogue 118 of FIG. 1, for example, the geometric shape of simplified representation 390 can take the form of a circle that represents a rim of an opening of drogue 118 that is configured to receive probe 120. Simplified representation 390 can assist human operators and downstream automation processes (e.g., of automation module 354) to perform a task that utilizes the modified image as input (e.g., visual feedback).

Within modified image 330-2, visual features representing object 360-2 and other objects 394 present within image 304 can have a different appearance as a result of the modification of pixel intensity values. For example, certain visual features of one or both of object 360-2 and objects 394 can be enhanced, diminished, blurred, eroded, or smoothed within bounding region 360-2.

As shown schematically in FIG. 3, modified images 330, including modified image 330-2 can be used by object detector 352 to detect object 360-2 within image 304, and the location of the detected object can be provided as input to automation module 354. In this example, automation module 354 generates a control command 396 (CMD 396 in FIG. 3) based on the location of the object within image 304 that can be provided as input to controlled devices 320 (e.g., via control interface 138 of FIG. 1).

Within FIG. 3, input/output subsystem 314 of computing system 162 can include the previously described control interfaces 138, user interfaces 140, and communications interfaces 142 of FIG. 1, as well as analogous interfaces of remote computing devices 160. Peripheral devices 322 can include imaging system 136 of FIG. 1, including camera 144 and illumination source 146. Additionally, peripheral devices 322 can include user input devices and output devices, such as a graphical display for displaying modified images 330, human operator control devices for providing a control input, etc.

FIGS. 4A-4L show example images that can be captured and processed by computer vision system 100 of FIG. 1 performing aspects of method 200 of FIGS. 2A and 2B. As an example, the images of FIGS. 4A-4L can take the form of a time-bases series of images captured by an infrared camera on-board second aeronautical vehicle 114 of FIG. 1 during an aerial refueling operation.

Figure 4B:
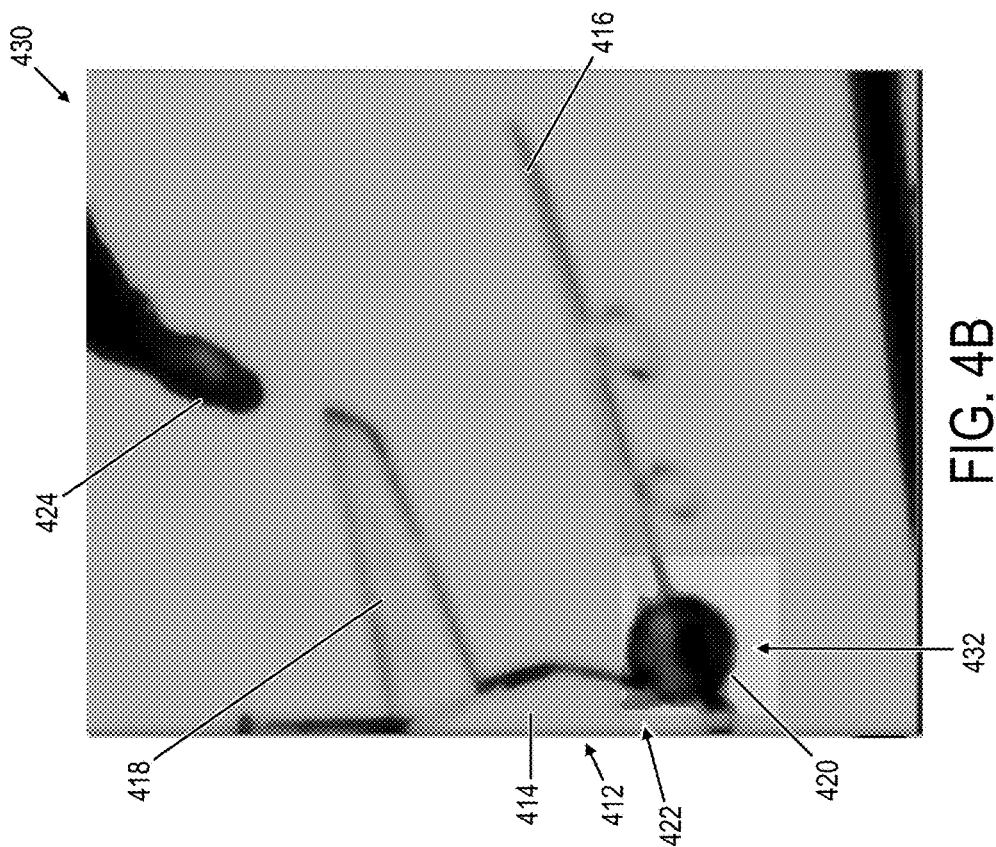
Figure 4A:
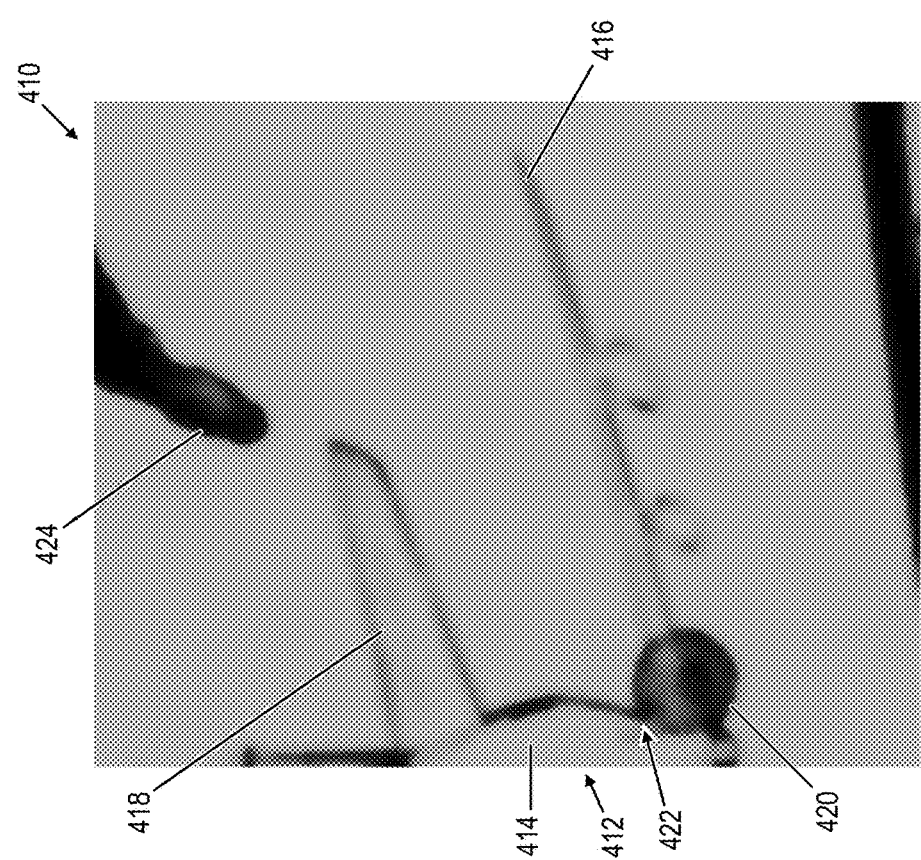

Image 410 of FIG. 4A is an example of an infrared image that can refer to an unprocessed infrared image or an infrared image that has been preprocessed. Within image 410 of FIG. 4A, portions of an aircraft 412 are visible, including a fuselage 414, a wing 416, and a tail 418. Also within image 410, an aerial refueling drogue 420 is visible trailing behind aircraft 412 and partially occluding portions of aircraft 412. Aircraft 412 can refer to first aeronautical vehicle 112 of FIG. 1, and drogue 420 can refer to drogue 118 of FIG. 1. Portions of drogue 420 and aircraft 412 have similar light intensity values within image 410 at a region of intersection 422 between pixels representing the drogue and pixels representing the aircraft. Region of intersection 422 between pixels of drogue 420 and pixels of aircraft 412 can present challenges for computer vision technologies, such as object detection, object tracking, object segmentation, edge detection, etc. A portion of a probe 424 is also visible within image 410. As an example, probe 424 can refer to probe 120 of FIG. 1 located on-board second aeronautical vehicle 114 from which image 410 was captured.

Modified image 430 of FIG. 4B is an example of a processed infrared image generated by implementation of method 200 using image 410 of FIG. 4A as input. Within image 430, a bounding region 432 is visible, within which light intensity values of pixels have been both increased and reduced as described, for example, at operations 236 and 238 of FIG. 2A. Increased contrast within bounding region 432 can enable features of drogue 420 or other object of interest to be more clearly distinguished from features of aircraft 412 or other objects present within the image. The effect of increasing contrast by application of method 200 can increase or otherwise provide distinguishable identity (e.g., numerically via modified light intensity values) to the objects within image 430.

Image 440 of FIG. 4C is another infrared image of the time-based series of images captured prior to image 410 of FIG. 4A. Image 440 can refer to an unprocessed infrared image or an infrared image that has been preprocessed. Within image 440, the object being detected (e.g., drogue 420) is located further away from the camera and the illumination source as compared to image 410 of FIG. 4A. Also within image 440, a hose 432 (e.g., hose 116 of FIG. 1) is visible connected to drogue 420 (e.g., represented within image 440 by pixels defining a circular object). Pixels of hose 432 intersect with pixels of aircraft 412 within image 430 at a region of intersection 434. These intersecting pixels of two different objects can again present challenges to computer vision technologies. For example, where edge detection is applied to image 440, objects such as drogue 420, hose 432, and aircraft 412 may be inaccurately identified as forming part of the same object. This is due to the fact that these objects within image 440 are represented by pixels having similar light intensity values.

Modified image 450 of FIG. 4D is an example of a processed infrared image generated by implementation of method 200 using image 440 of FIG. 4C as input. Within image 450, a bounding region 452 is visible, within which light intensity values of pixels have been both increased and reduced as described, for example, at operations 236 and 238 of FIG. 2A. Image 450 within bounding region 452 has the appearance of blurring and smoothing of object features, including hose 432 and drogue 420.

Image 460 of FIG. 4E is another infrared image of the time-based series of images captured after image 410 of FIG. 4A. Image 460 can refer to an unprocessed infrared image or an infrared image that has been preprocessed. Within image 460, the object being detected (e.g., drogue 420) is located closer to the camera and illumination source as compared to image 410 of FIG. 4A. Drogue 420, in this example, includes features such as splines shown generally at 462 that can present additional challenges for computer vision technologies to process.

Modified image 470 of FIG. 4F is an example of a processed infrared image generated by implementation of method 200 using image 460 of FIG. 4E as input. Within modified image 470 of FIG. 4F, a bounding region 472 is visible, within which light intensity values of pixels have been both increased and reduced as described, for example, at operations 236 and 238 of FIG. 2A. In this example, definition between or among splines 462 decreases in modified image 470 as compared to image 460. This reduced definition, blurring, or a combination thereof among splines or other details of drogue 420 can improve performance of computer vision technologies applied to modified image 470 as compared to image 460. For example, a circular shape 474 of drogue 420 within modified image 470 representing an opening rim of the drogue can be more easily detected by application of computer vision technologies.

Figure 4I:
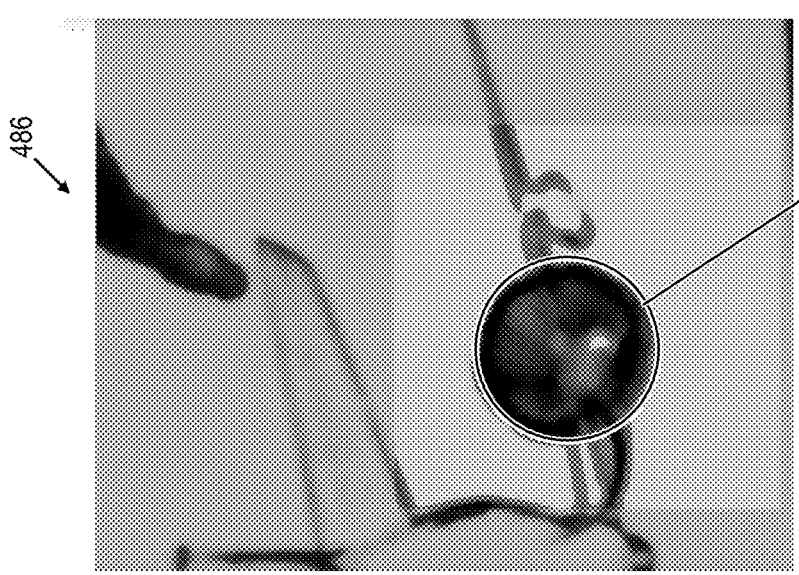
Figure 4H:
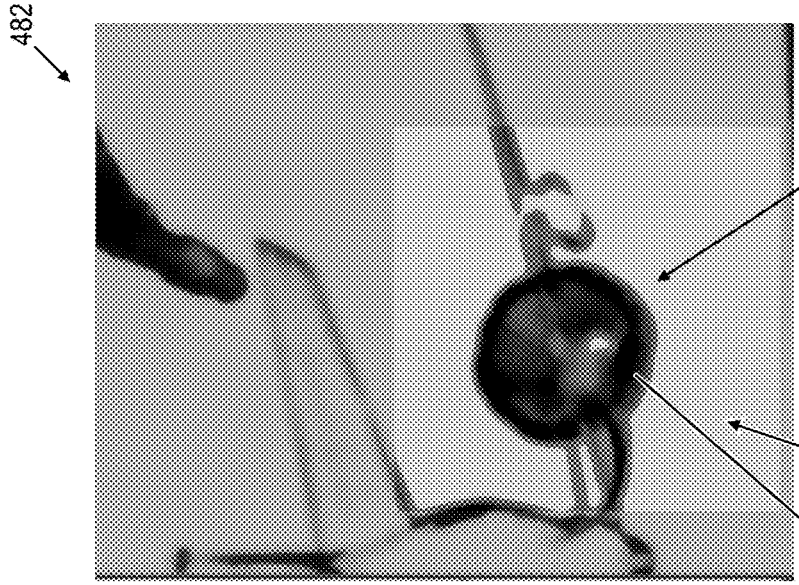
Figure 4G:
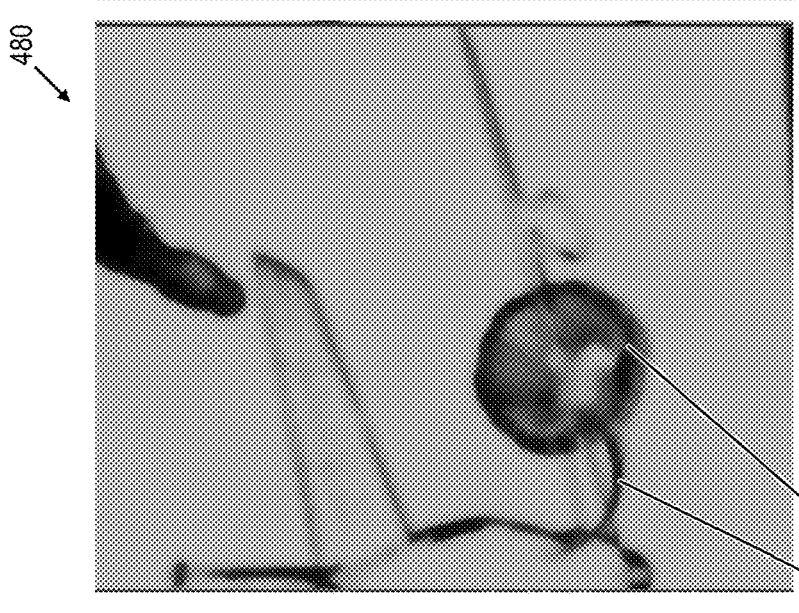

Image 480 of FIG. 4G is another infrared image of the time-based series of images captured after image 460 of FIG. 4E. Image 480 that can refer to an unprocessed infrared image or an infrared image that has been preprocessed. Within image 480, the object being detected (e.g., drogue 420) is located closer to the camera and illumination source as compared to image 460 of FIG. 4E. As drogue 420 has moved closer to the camera and occupies a larger portion of the image frame, image 480 can be difficult for object detection algorithms to process.

Modified image 482 of FIG. 4H is an example of a processed infrared image generated by implementation of method 200 using image 480 of FIG. 4G as input. Within modified image 482 of FIG. 4H, a bounding region 484 is visible, within which light intensity values of pixels have been both increased and reduced as described, for example, at operations 236 and 238 of FIG. 2A. For example, within modified image 482, hose 432 attached to circular object 481 representing the opening rim of drogue 420 and pixels around the hose and the circular object are filled in (e.g., smoothed or blurred) as compared to image 480, enabling performance of computer vision techniques applied to modified image 482 to be improved relative to image 480.

FIG. 4I depicts an example of a modified image 486 that includes a simplified representation 488 (e.g., a graphical circle) of circular object 481 (e.g., the opening rim) of drogue 420 that is applied to modified image 492. As an example, simplified representation 488 can be included within modified image 486 by performing operations 260 and 270 of FIG. 2B. In another example, simplified representation 488 can be included in the original subject image to provide a modified image that includes the simplified representation.

Image 490 of FIG. 4J is another infrared image of the time-based series of images captured after image 480 of FIG. 4G. Image 490 that can refer to an unprocessed infrared image or an infrared image that has been preprocessed. Within image 490, the object being detected (e.g., drogue 420) is located closer to the camera and illumination source as compared to image 480 of FIG. 4G. Modified image 492 of FIG. 4K is an example of a processed infrared image generated by implementation of method 200 using image 490 of FIG. 4J as input. Within modified image 492 of FIG. 4K, a bounding region 494 is visible, within which light intensity values of pixels have been both increased and reduced as described, for example, at operations 236 and 238 of FIG. 2A.

Within images 490 and 492 of FIGS. 4J and 4K, drogue 420 is larger than within the preceding images of FIGS. 4A-4I, and bounding region 494 is also larger than the previously described bounding regions 484, 472, 452, and 432 of FIG. 4B due to the increased size of drogue 420 within the image. Because the object to be detected and the bounding region are increased in size relative to a size of the images, computer vision techniques applied to unprocessed image 490 may inappropriately devote computing resources to detecting sub-features of the object, such as splines 491 of drogue 420. By contrast, within modified image 492, sub-features of the object to be detected, such as splines 491 of drogue 420 have the appearance of being blurred or otherwise have reduced definition.

FIG. 4L depicts an example of a modified image 496 that includes a simplified representation 490 (e.g., a graphical circle) of the opening rim of drogue 420 being applied to modified image 492. As an example, simplified representation 490 can be included within modified image 496 by performing operations 260 and 270 of FIG. 2B. In another example, simplified representation 490 can be included in the original subject image to provide a modified image that includes the simplified representation.

The various methods and operations described herein may be tied to a computing system of one or more computing devices. In particular, such methods and operations can be implemented as one or more computer-application programs, a computer-implemented service, an application-programming interface (API), a computer data library, other set of machine-executable instructions, or a combination of these examples.

As previously described, FIGS. 1 and 3 schematically depict aspects of an example computing system that includes one or more computing devices. A computing system or computing devices thereof can take the form of one or more personal computers, server computers, tablet computers, networking computers, mobile computers, computers integrated into other devices or machinery, other computing devices, or combinations of these examples. While components of an example computing system are described in further detail below, it will be understood that any of the computing systems or computing devices described herein can also include one or more logic devices, one or more data storage devices, an input/output subsystem, and other suitable components.

A logic device, as described herein, includes one or more physical devices configured to execute instructions. For example, a logic device may be configured to execute instructions that are part of one or more applications, services, programs, routines, libraries, objects, components, data structures, or other logical constructs. Such instructions may be implemented to perform a task, implement a data type, transform the condition of one or more components, achieve a technical effect, or otherwise arrive at a desired result.

A logic device can include one or more processor devices configured to execute software instructions. Additionally or alternatively, a logic device may include one or more hardware or firmware logic devices configured to execute hardware or firmware instructions. Processor devices of a logic device can be single-core or multi-core, and the instructions executed thereon may be configured for sequential, parallel, and distributed processing. Individual components of a logic device can be distributed among two or more separate devices, can be remotely located, and can be configured for coordinated processing. Aspects of a logic device can be virtualized and executed by remotely accessible, networked computing devices configured in a cloud-computing configuration.

A data storage device, as described herein, includes one or more physical devices configured to hold instructions or other data executable by a logic device to implement the methods and operations described herein. When such methods and operations are implemented, a condition or state of the data storage device can be transformed—e.g., to hold different data. The data storage device can include one or both of removable devices and built-in devices. A data storage device can include optical memory, semiconductor memory (e.g., RAM, EPROM, EEPROM, etc.), and magnetic memory (e.g., hard-disk drive, floppy-disk drive, tape drive, MRAM, etc.), among others. A data storage device can include volatile, nonvolatile, dynamic, static, read/write, read-only, random-access, sequential-access, location-addressable, file-addressable, and content-addressable devices. While a data storage device, includes one or more physical devices, aspects of the executable instructions described herein alternatively can be propagated by a communication medium (e.g., an electromagnetic signal, an optical signal, etc.) that is not held by a physical device for a finite duration, under at least some conditions.

Aspects of a logic device and a data storage device of a computing device or computing system can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module" and "program" are used herein to describe an aspect of a computing system implemented to perform a particular function. In at least some examples, a module or program can be instantiated via a logic device executing instructions held by or retrieved from a data storage device. It will be understood that different modules or programs can be instantiated from the same application, service, code block, object, library, routine, API, function, etc. Likewise, the same module or program can be instantiated by different applications, services, code blocks, objects, routines, APIs, functions, etc. The terms "module" or "program" can encompass individual or groups of executable files, data files, libraries, drivers, scripts, database records, etc.

In at least some examples, the computer executable instructions disclosed herein can take the form of a service that refers to a program executable across multiple sessions. A service can be available to one or more system components, programs, and other services. As an example, a service can run on one or more server computing devices.

An input/output subsystem, as described herein, can include an interface with one or more user input devices such as a keyboard, mouse, touch screen, handheld controller, microphone, camera, etc.; one or more output devices such as a display device, audio speaker, printer, etc.; and serve as a communications interface with one or more other devices.

A display device can be used to present a visual representation of data held by a data storage device of a computing device or computing system. This visual representation can take the form of a graphical user interface. As the herein described methods and operations can change the data held by a data storage device, and thus transform the condition or state of the data storage device, the condition or state of the display device can likewise be transformed to visually represent changes in the underlying data. Display devices can be combined with one or both of a logic device and a data storage device of a computing device or computing system in a shared enclosure, or such display devices can be peripheral display devices.

A communications interface of a computing device can be used to communicatively couple the computing device with one or more other computing devices. The communications interface can include wired and wireless communication devices compatible with one or more different communication protocols. In at least some examples, the communications interface can allow the computing device to send and receive messages to and from other devices via a communications network, which can include the Internet or a portion thereof, wireless radio networks, or other suitable types of networks.

Examples of the present disclosure are provided in the following enumerated paragraphs.

A.1. A computer vision method (200) performed by a computing system (e.g., 162), the method comprising: receiving (e.g., 214) a time-based series of images (e.g., 300); for a subject image (e.g., 304) of the time-based series, identifying (e.g., 218) a light intensity value (e.g., 372) for each pixel (e.g., 366, 368) of a set of pixels (e.g., 380) of the subject image; defining (e.g., 222) a light intensity threshold (e.g., 378) for the subject image based on a size (e.g., 363) of a bounding region (e.g., 362-1) for an object (e.g., 360-1) detected within a previous image (e.g., 302) of the time-based series captured before the subject image; generating (e.g., 234) a modified image (e.g., 330-2) for the subject image by one or both of: reducing (e.g., 236) the light intensity value of each pixel of a lower intensity subset of pixels (e.g., 366) of the subject image that is less than the light intensity threshold, and increasing (e.g., 238) the light intensity value of each pixel (e.g., 368) of a higher intensity subset of pixels (e.g., 368) of the subject image that is greater than the light intensity threshold.

A.2. The method of paragraph A.1, further comprising: defining (e.g., 256) the bounding region within the previous image based on detection of the object within the previous image; and identifying (e.g., 258) the size of the bounding region within the previous image.

A.3. The method of any of the preceding paragraphs A.1-A.2, wherein the light intensity threshold is defined by a light intensity value identified for a pixel of the set of pixels that represents a predefined percentile (e.g., 388) of light intensity values identified among the set of pixels.

A.4. The method of any of the preceding paragraphs A.1-A.3, wherein the light intensity value of each pixel of the lower intensity subset of pixels is reduced by an amount that is based on a downward scaling factor (e.g., 386) that is applied to the light intensity value identified for that pixel; and wherein the light intensity value of each pixel of the higher intensity subset of pixels is increased by an amount that is based on an upward scaling factor (e.g., 384) that is applied to the light intensity value identified for that pixel.

A.5. The method of any of the preceding paragraphs A.1-A.4, wherein the light intensity value of the lower intensity subset of pixels is reduced by 12% to 18% of the light intensity value of that pixel.

A.6. The method of any of the preceding paragraphs A.1-A.5, wherein the light intensity value of the higher intensity subset of pixels is increased by 8% to 12% of the light intensity value of that pixel.

A.7. The method of any of the preceding paragraphs A.1-A.6, wherein the light intensity value of the lower intensity subset of pixels is reduced by a greater amount as the size of the bounding region increases, and is reduced by a lesser amount as the size of the bounding region decreases.

A.8. The method of any of the preceding paragraphs A.1-A.7, wherein the light intensity value of the higher intensity subset of pixels is increased by a greater amount as the size of the bounding region increases, and is increased by a lesser amount as the size of the bounding region decreases.

A.9. The method of any of the preceding paragraphs A.1-A.8, wherein the light intensity values of the set of pixels are infrared light intensity values (e.g., 372) captured by an infrared camera (e.g., 144).

A.10. The method of any of the preceding paragraphs A.1-A.9, further comprising: processing (e.g., 260) the modified image to identify a location (e.g., 392) within the modified image of the object.

A.11. The method of any of the preceding paragraphs A.1-A.10, further comprising: generating (e.g., 266) a simplified representation (e.g., 390) of the object within the modified image based on the location.

A.12. The method of any of the preceding paragraphs A.1-A.11, further comprising: generating (e.g., 272) a command (e.g., 396) to a controlled device (e.g., 320) based on the location of the predefined object within the modified image.

A.13. The method of any of the preceding paragraphs A.1-A.12, wherein defining the light intensity threshold for the subject image is based on the size of the bounding region relative to a size (e.g., 305) of the subject image.

A.14. The method of any of the preceding paragraphs A.1-A.13, further comprising: determining (e.g., 232) a maximum light intensity value (e.g., 374) among the set of pixels of the subject image.

A.15. The method of any of the preceding paragraphs A.1-A.14, wherein reducing or increasing the light intensity value is based on a maximum light intensity value of the subject image.

B.1. A computer vision system (e.g., 100), comprising: a computing system (e.g., 162) of one or more computing devices (e.g., 132, 160) programmed with instructions (e.g., 316) executable by the computing system to: receive (e.g., 214) a time-based series of images (e.g., 300) captured via a camera (e.g., 144); for a subject image (e.g., 304) of the time-based series, identify (e.g., 218) a light intensity value (e.g., 372) for each pixel (e.g., 366, 368) of a set of pixels (e.g., 380) of the subject image; define (e.g., 222) a light intensity threshold (e.g., 378) for the subject image based on a size (e.g., 363) of a bounding region (e.g., 362-1) for an object (e.g., 360-1) detected within a previous image (e.g., 302) of the time-based series captured before the subject image; generate (e.g., 234) a modified image (e.g., 330-2) for the subject image by one or both of: reducing (e.g., 236)

the light intensity value of each pixel of a lower intensity subset of pixels (e.g., 366) of the subject image that is less than the light intensity threshold, and increasing (e.g., 238) the light intensity value of each pixel (e.g., 368) of a higher intensity subset of pixels (e.g., 368) of the subject image that is greater than the light intensity threshold.

B.2. The computer vision system of paragraph B.1, further comprising: an infrared illumination source (e.g., 146); and an infrared camera (e.g., 144) by which the time-based series of images are captured; wherein the light intensity values are infrared light intensity values.

B.3. The computer vision system of any of the preceding paragraphs B.1-B.2, wherein the infrared illumination source and the infrared camera are mounted upon an aeronautical vehicle (e.g., 114); wherein one or more computing devices of the computing system are remotely located off-board the aeronautical vehicle; and wherein the time-based series of images are received from the aeronautical vehicle via a wireless communications network (e.g., 164).

B.4. The computer vision system of any of the preceding paragraphs B.1-B.3, wherein the light intensity threshold is defined by a light intensity value identified for a pixel of the set of pixels that represents a predefined percentile (e.g., 388) of light intensity values identified among the set of pixels.

C.1. A computer vision method (e.g., 200) performed by a computing system (e.g., 162), the method comprising: receiving (e.g., 214) a time-based series of images (e.g., 300); for a subject image (e.g., 304) of the time-based series, identifying (e.g., 218) a light intensity value (e.g., 372) for each pixel (e.g., 366, 368) of a set of pixels (e.g., 380) of the subject image, wherein the set of pixels forms a portion of the subject image; defining (e.g., 222) a light intensity threshold (e.g., 378) for the subject image; generating (e.g., 234) a modified image (e.g., 330-2) for the subject image by one or both of: reducing (e.g., 236) the light intensity value of each pixel of a lower intensity subset of pixels (e.g., 366) of the subject image that is less than the light intensity threshold by an amount that is based on a downward scaling factor (e.g., 386) applied to the lower intensity subset of pixels, and increasing (e.g., 238) the light intensity value of each pixel (e.g., 368) of a higher intensity subset of pixels (e.g., 368) of the subject image that is greater than the light intensity threshold by an amount that is based on an upward scaling factor (e.g., 384) applied to the higher intensity subset of pixels.

It will be understood that the configurations and techniques described herein are exemplary in nature, and that specific embodiments and examples are not to be considered in a limiting sense, because numerous variations are possible. The specific methods described herein may represent one or more of any number of processing strategies. As such, the disclosed operations may be performed in the disclosed sequence, in other sequences, in parallel, or omitted, in at least some examples. Thus, the order of the above-described operations may be changed, in at least some examples. Claimed subject matter is not limited to implementations that solve any or all disadvantages noted in any part of this disclosure. The subject matter of the present disclosure includes all novel and non-obvious combinations and sub-combinations of the various methods, systems, configurations, and other features, functions, acts, and properties disclosed herein, as well as any and all equivalents thereof.

The invention claimed is:

1. A computer vision method performed by a computing system, the method comprising:
   receiving a time-based series of images;
   for a subject image of the time-based series, identifying a light intensity value for each pixel of a set of pixels of the subject image;
   defining a light intensity threshold for the subject image based on a size of a bounding region for an object detected within a previous image of the time-based series captured before the subject image;
   wherein the set of pixels of the subject image are located within the bounding region;
   generating a modified image for the subject image by one or both of:
      reducing the light intensity value of each pixel of a lower intensity subset of pixels of the subject image located within the bounding region that is less than the light intensity threshold, and
      increasing the light intensity value of each pixel of a higher intensity subset of pixels of the subject image located within the bounding region that is greater than the light intensity threshold.

2. The method of claim 1, further comprising:
   defining the bounding region within the previous image based on detection of the object within the previous image; and
   identifying the size of the bounding region within the previous image.

3. The method of claim 1, wherein the light intensity threshold is defined by a light intensity value identified for a pixel of the set of pixels that represents a predefined percentile of light intensity values identified among the set of pixels.

4. The method of claim 1, wherein the light intensity value of each pixel of the lower intensity subset of pixels is reduced by an amount that is based on a downward scaling factor that is applied to the light intensity value identified for that pixel; and
   wherein the light intensity value of each pixel of the higher intensity subset of pixels is increased by an amount that is based on an upward scaling factor that is applied to the light intensity value identified for that pixel.

5. The method of claim 1, wherein the light intensity value of the lower intensity subset of pixels is reduced by 12% to 18% of the light intensity value of that pixel.

6. The method of claim 1, wherein the light intensity value of the higher intensity subset of pixels is increased by 8% to 12% of the light intensity value of that pixel.

7. The method of claim 1, wherein the light intensity value of the lower intensity subset of pixels is reduced by a greater amount as the size of the bounding region increases, and is reduced by a lesser amount as the size of the bounding region decreases.

8. The method of claim 1, wherein the light intensity value of the higher intensity subset of pixels is increased by a greater amount as the size of the bounding region increases, and is increased by a lesser amount as the size of the bounding region decreases.

9. The method of claim 1, wherein the light intensity values of the set of pixels are infrared light intensity values captured by an infrared camera.

10. The method of claim 1, further comprising:
    processing the modified image to identify a location within the modified image of the object.

11. The method of claim 10, further comprising:
generating a simplified representation of the object within the modified image based on the location.

12. The method of claim 10, further comprising:
generating a command to a controlled device based on the location of the predefined object within the modified image.

13. The method of claim 1, wherein defining the light intensity threshold for the subject image is based on the size of the bounding region relative to a size of the subject image.

14. The method of claim 1, further comprising:
determining a maximum light intensity value among the set of pixels of the subject image.

15. The method of claim 1, wherein reducing or increasing the light intensity value is based on a maximum light intensity value of the subject image.

16. A computer vision system, comprising:
a computing system of one or more computing devices programmed with instructions executable by the computing system to:
receive a time-based series of images captured via a camera;
for a subject image of the time-based series, identify a light intensity value for each pixel of a set of pixels of the subject image;
define a light intensity threshold for the subject image based on a size of a bounding region for an object detected within a previous image of the time-based series captured before the subject image;
wherein the set of pixels of the subject image are located within the bounding region;
generate a modified image for the subject image by one or both of:
reducing the light intensity value of each pixel of a lower intensity subset of pixels located within the bounding region of the subject image that is less than the light intensity threshold, and
increasing the light intensity value of each pixel of a higher intensity subset of pixels located within the bounding region of the subject image that is greater than the light intensity threshold.

17. The computer vision system of claim 16, further comprising:
an infrared illumination source; and
an infrared camera by which the time-based series of images are captured;
wherein the light intensity values are infrared light intensity values.

18. The computer vision system of claim 17, wherein the infrared illumination source and the infrared camera are mounted upon an aeronautical vehicle;
wherein one or more computing devices of the computing system are remotely located offboard the aeronautical vehicle; and
wherein the time-based series of images are received from the aeronautical vehicle via a wireless communications network.

19. The computer vision system of claim 16, wherein the light intensity threshold is defined by a light intensity value identified for a pixel of the set of pixels that represents a predefined percentile of light intensity values identified among the set of pixels.

20. A computer vision method performed by a computing system, the method comprising:
receiving a time-based series of images;
for a subject image of the time-based series, identifying a light intensity value for each pixel of a set of pixels of the subject image, wherein the set of pixels forms a portion of the subject image containing an object within a previous image to the subject image within the time-based series;
defining a light intensity threshold for the subject image based on a size of the portion of the subject image;
generating a modified image for the subject image by one or both of:
reducing the light intensity value of each pixel of a lower intensity subset of pixels located within the portion of the subject image that is less than the light intensity threshold by an amount that is based on a downward scaling factor applied to the lower intensity subset of pixels, and
increasing the light intensity value of each pixel of a higher intensity subset of pixels located within the portion of the subject image that is greater than the light intensity threshold by an amount that is based on an upward scaling factor applied to the higher intensity subset of pixels.

* * * * *